United States Patent
Berscheid et al.

(10) Patent No.: US 9,853,751 B2
(45) Date of Patent: Dec. 26, 2017

(54) METHOD OF ESTIMATING THE FREQUENCY RESPONSE OF MULTIPATH CHANNELS

(71) Applicant: Vecima Networks Inc., Victoria (CA)

(72) Inventors: Brian Michael Berscheid, Saskatoon (CA); Tung Trong Nguyen, Saskatoon (CA); Joseph Eric Salt, Saskatoon (CA); Ha Hoang Nguyen, Saskatoon (CA)

(73) Assignee: Vecima Networks Inc., Victoria (CA)

( * ) Notice: Subject to any disclaimer, the term of this patent is extended or adjusted under 35 U.S.C. 154(b) by 51 days.

(21) Appl. No.: 14/976,854

(22) Filed: Dec. 21, 2015

(65) Prior Publication Data

US 2017/0180063 A1    Jun. 22, 2017

(51) Int. Cl.
  *H04L 12/26* (2006.01)
  *H04B 17/309* (2015.01)
  *H04L 27/26* (2006.01)

(52) U.S. Cl.
  CPC .......... *H04B 17/309* (2015.01); *H04L 27/26* (2013.01)

(58) Field of Classification Search
  CPC . H04L 27/26; H04L 25/0202; H04L 25/0204; H04L 25/0222; H04B 17/309
  See application file for complete search history.

(56) References Cited

U.S. PATENT DOCUMENTS

| | | | | |
|---|---|---|---|---|
| 2005/0117660 A1* | 6/2005 | Vialle | ................... | H04B 1/7115 375/299 |
| 2008/0049600 A1* | 2/2008 | Liu | ...................... | H04L 25/0212 370/208 |
| 2010/0080112 A1* | 4/2010 | Bertrand | ............. | H04L 27/2675 370/208 |
| 2010/0232488 A1* | 9/2010 | Song | .................... | H04B 17/309 375/224 |
| 2012/0115427 A1* | 5/2012 | Hui | ....................... | H04B 7/0417 455/226.1 |
| 2012/0294224 A1* | 11/2012 | Silva | .................. | H04B 7/15521 370/315 |
| 2016/0050097 A1* | 2/2016 | Atungsiri | ............ | H04L 27/2602 375/295 |
| 2016/0261307 A1* | 9/2016 | Hameau | ................ | H04B 1/7163 |
| 2016/0344442 A1* | 11/2016 | Murai | .................. | H04B 1/7073 |

\* cited by examiner

*Primary Examiner* — Ian N Moore
*Assistant Examiner* — Phong La
(74) *Attorney, Agent, or Firm* — Dienwiebel Transatlantic IP

(57) ABSTRACT

In a digital communication system there is provided a method for OFDM channel estimation that jointly considers the effects of coarse timing error and multipath propagation. The method uses an iterative channel estimation technique, which considers the practical scenario of fractional timing error and non-sample space echo delays. The method does not require channel state information such as second-order statistic of the channel impulse responses or the noise power. Moreover, timing error can be conveniently obtained with the proposed technique. Simulation shows that, when comparing OFDM channel estimation techniques under DOCSIS 3.1 realistic channel conditions, the proposed algorithm significantly outperforms conventional methods.

8 Claims, 11 Drawing Sheets

METHOD OF ESTIMATING THE FREQUENCY RESPONSE OF MULTIPATH CHANNELS

This invention relates to a method at the receiver of estimating the frequency response of multipath channels which is particularly but not exclusively directed to DOCSIS 3.1 uplink channels.

While the method is particularly applicable to the above, it can also be used in any digital communication systems including but not limited to single-carrier QAM and multi-carrier OFDM/OFDMA systems.

BACKGROUND OF THE INVENTION

The demand for data services has steadily increased putting continuous pressure on data service providers to increase the data throughput of their networks. CATV networks are governed by a set of DOCSIS standards that place hard limits on bandwidth and data rates. The latest version of the DOCSIS standard, DOCSIS 3.1 was released in October 2013. DOCSIS 3.1 increases the bandwidth and data throughput available in CATV networks by up to 10 Gbps downstream and 1 Gbps upstream.

DOCSIS 3.1 is markedly different from prior versions of the standard in that Orthogonal Frequency Division Multiple Access (OFDMA) is used in both the upstream and downstream directions. By effectively modulating signals on narrow-band carriers, OFDM can mitigate inter-symbol interference while simplifying the structure of the channel equalizer.

While OFDMA systems have been studied for many years, the DOCSIS 3.1 standard is unique in that it combines OFDMA with very high-order modulation schemes (up to 4096-QAM). Furthermore, cable plants generate a number of channel impairments, some of which differ from typical OFDMA systems discussed in the literature.

In order to effectively demodulate a spectrally efficient signal, it is necessary to employ coherent demodulation which involves estimation and tracking of the multipath channel. To aid in channel estimation, DOCSIS 3.1 specifies a pilot-based wide-band probing mode, where the sub-carriers of an OFDM symbol are dedicated to channel estimation.

There are several channel estimation techniques that have been studied for pilot-based estimation. The simplest one, which is Least Square (LS) estimation, as set out in Document 1 below, does not require any channel state information (CSI). LS estimators work with samples in the frequency domain and are relatively low in complexity. However, they suffer from relatively high mean-square error, which is proportional to the power of additive white Gaussian noise (AWGN).

A better technique, which also performs estimation in the frequency domain, is linear minimum mean-square error (LMMSE) estimation in the Document 2 below. This technique yields much better performance than the LS estimator, especially under low signal-to-noise ratio (SNR) scenarios. The major drawback of the LMMSE estimator is that it requires knowledge of the channel auto-correlation matrix and the noise variance, which are usually unknown at the receiver. The computational complexity of the LMMSE estimator is also very high as it requires a matrix inversion. Many have attempted to reduce the complexity of the LMMSE estimator (as set out in Documents 3 and 4 below) at the expense of a small sacrifice in estimation accuracy.

Another very good approach uses discrete Fourier transform (DFT) based channel estimation. The DFT-based method firstly employs an LS estimator to obtain the channel's frequency response (CFR). Then the discrete-time channel impulse response (CIR) is obtained by performing an inverse discrete Fourier transform (IDFT) on the CFR. Since the energy of the CIR is typically concentrated in a few taps having short delays, the algorithm's performance can be improved if a few taps whose power is significantly higher than noise are preserved while the rest are forced to zero (as set out in Document 5 below). This operation is commonly referred to as denoising. After denoising, the CIR is transformed back to the frequency domain to obtain the estimated CFR. Consequently, the DFT approach helps to remove the noise power from the LS-estimated CFR. In general, DFT-based methods have moderate complexity thanks to Fast Fourier Fransform (FFT) algorithms and perform much better than the LS estimator at low SNRs (as set out in Document 6 below).

However, with the DFT method, performance degradation can occur due to leakage between samples in the discrete-time CIR. There are two sources of leakage. The first is leakage by multipath components that have non sample-spaced delays. In the case of non sample-spaced delays, the energy from a single multipath component is spread over multiple sample-spaced taps in the discrete time CIR. When the noise-only taps are eliminated, portions of the leakage energy are also removed and thus the estimation will show an error floor. The second type of leakage emerges if not all sub-carriers are used for channel estimation. In particular, in a typical OFDM system, the sub-carriers at both ends of the spectrum are left null to form guard bands. Not using the end sub-carriers degrades the performance of DFT-based techniques as this is equivalent to placing a rectangular window in the frequency domain which translates to convolution with a sinc-like function in the time domain. This causes the energy of the CIR to spread out in time. Denoising cuts off the tails of the sinc-like functions causing ripples around the edge sub-carriers when the denoised CIR is converted back to the frequency domain (as set out in Document 7 below). This phenomenon is often referred to as an "edge effect" or "border effect" and results in estimation errors not being equally distributed over all sub-carriers. To date studies that effectively address the two leakage issues of the DFT-based techniques have not been found.

The usefulness of the standard channel estimation techniques discussed above is somewhat limited in DOCSIS 3.1 systems, as upstream wideband probing has a subcarrier skipping option. In subcarrier skipping mode, multiple upstream users transmit wideband probing signals on different subcarriers of the same OFDM symbol. Each user transmits on a different set of subcarriers that are spaced K sub-carriers apart, where K is the number of simultaneous users. The use of subcarrier skipping with K simultaneous users allows a K-fold increase in the efficiency of the wideband probing process as compared to a single user probing scheme. However, it places additional computational burden on the receiver, which must generate an estimate of the entire channel for each user despite receiving pilots on only every K'th subcarrier.

The following documents provide further information on this subject:

[1] Y. Shen and E. Martinez, "Channel Estimation in OFDM Systems," *Freescale Semiconductor Application Note*, 2006.

[2] J.-J. van de Beek, O. Edfors, M. Sandell, S. Wilson, and P. Ola Borjesson, "On channel estimation in OFDM systems," in *Proc. IEEE Veh. Technol. Conf*, vol. 2, July 1995, pp. 815-819.

[3] O. Edfors, M. Sandell, J.-J. van de Beek, S. Wilson, and P. Borjesson, "OFDM channel estimation by singular value decomposition," *IEEE Trans. Commun.*, vol. 46, no. 7, pp. 931-939, July 1998.

[4] M. Noh, Y. Lee, and H. Park, "Low complexity LMMSE channel estimation for OFDM," *IEE Proc. Commun.*, vol. 153, no. 5, pp. 645-650, October 2006.

[5] Y. Zhao and A. Huang, "A novel channel estimation method for OFDM mobile communication systems based on pilot signals and transform-domain processing," in *Proc. IEEE Veh. Technol. Conf.*, vol. 3, May 1997, pp. 2089-2093.

[6] Y. Kang, K. Kim, and H. Park, "Efficient DFT-based channel estimation for OFDM systems on multipath channels," *IET Commun.*, vol. 1, no. 2, pp. 197-202, April 2007.

[7] M. Ozdemir and H. Arslan, "Channel Estimation for Wireless OFDM Systems," *IEEE Commun. Surveys Tutorials*, vol. 9, no. 2, pp. 18-48, July 2007.

[8] Cable Television Laboratories, Inc., "DOCSIS 3.1 Physical Layer Specification," October 2013.

[9] M. Morelli, "Timing and Frequency Synchronization for the Uplink of an OFDMA System," *IEEE Trans. Commun.*, vol. 52, no. 1, pp. 166-166, March 2004.

All publications, patents, and patent applications mentioned in this specification are herein incorporated by reference to the same extent as if each individual publication, patent, or patent application was specifically and individually indicated to be incorporated by reference. The disclosures in the above documents can be considered for further details of any matters not fully discussed herein.

SUMMARY OF THE INVENTION

According to the invention there is provided, in a digital communication system comprising:
a transmitter, a receiver and a transmission channel, which could be wired or wireless and may distort a transmitted signal;
the transmitted signal having the following characteristics:
a bandwidth and spectral shape known to both the transmitter and the receiver; a test sequence embedded within the transmitted signal;
the contents of the test sequence being known in advance by both the transmitter and the receiver;
the location of the test sequence both in time and frequency being known by both the transmitter and the receiver;
wherein transmission channel is a multipath channel comprising a plurality of channel paths, including a dominant channel path;
a method at the receiver of estimating the multipath channel's frequency response, comprising:
downconverting the received signal at the receiver to baseband;
locating and extracting the received version of the test sequence from the received signal;
executing a signal processing algorithm upon the received version of the test sequence in order to estimate the multipath channel's frequency response;
the signal processing algorithm comprising the steps of:
modeling the multipath channel as a series of L multipath components, each having an associated delay and gain factor which are to be estimated;
calculating an initial rough approximation of the multipath channel's impulse response using the received version of the test sequence;
iteratively estimating the delays and gain factors by:
a) performing peak detection on absolute values of the approximation of the multipath channel's impulse response to estimate the gain factor and delay of the dominant channel path;
b) modulating the gain factor and delay with a modeling function to obtain an estimate of the effect of the dominant channel path upon the approximation of the multipath channel's impulse response, where the modeling function is determined based upon the bandwidth and spectral shape of the transmitted signal;
c) subtracting the estimate of the effect of the dominant channel path from the approximation of the multipath channel's impulse response, such that the next largest channel path in terms of gain factor's magnitude becomes the dominant channel path in the remaining approximation of the multipath channel's impulse response;
d) repeating L-1 times, said delay and gain factor estimation steps a) to c) to fully obtain all delays and gain factors of the plurality of channel paths.
e) iteratively performing steps a) to d) one or more times in order to further refine the estimate of the delay and gain factors until a desired level of accuracy is reached; and
f) using the delay and gain factors obtained at the last iteration to obtain the frequency response of the multipath channel by applying a discrete Fourier transformation.

Preferably the initial rough approximation of the multipath channel's impulse response is upsampled to provide better resolution.

Preferably the peak detection is enhanced by performing log-domain interpolation.

Preferably the method further is arranged where the transmitted signal is an OFDM/OFDMA signal having the characteristics that the test sequence consists of a set of pilot subcarriers which are inserted into a single OFDM/OFDMA symbol, the pilot subcarriers are equally spaced with a constant subcarrier skipping factor of K where the pilot subcarriers can have guard-band at both sides of the spectrum wherein the signal processing algorithm has the following characteristics:
the rough initial estimation of the multipath channel impulse response is generated by performing an inverse discrete Fourier Transform upon the received version of the pilot subcarriers.

The modeling function used to obtain an estimate of the effect of the dominant channel path upon the multipath channel impulse response is a periodic sinc function as defined in eq. (22).

Preferably the initial rough approximation of the channels impulse response is calculated by using (NU/K)-point discrete Fourier Transform, as defined in eq. (17) hereinafter where U is suitably chosen upsampling factor.

Preferably the peak detection is enhanced by performing log-domain interpolation as defined in eq. (38) hereinafter.

Preferably the peak detection is enhanced by performing log-domain interpolation as defined in eq. (38) hereinafter.

BRIEF DESCRIPTION OF THE DRAWINGS

One embodiment of the invention will now be described in conjunction with the accompanying drawings in which:

FIG. 7 is a Table I which indicates micro-reflection characteristics for multi-echo scenario of DOCSIS 3.1 systems.

In the drawings like characters of reference indicate corresponding parts in the different figures.

DETAILED DESCRIPTION

Figure 1:
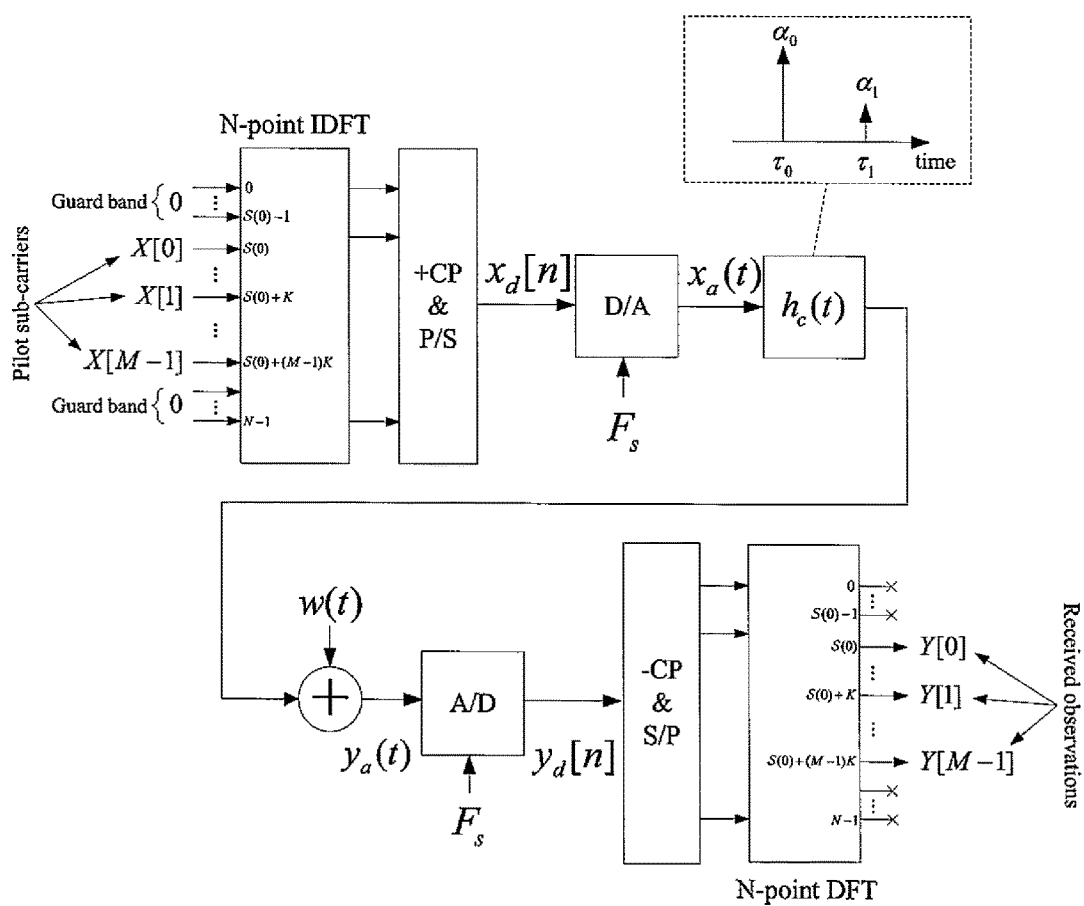
FIG. 1 is a schematic illustration of a baseband equivalent OFDM system for channel probing.

Consider the baseband-equivalent OFDMA system shown in FIG. 1. The channel bandwidth is divided into N sub-carriers, M of which are used for channel estimation and are assigned BPSK preamble symbols $X[m]$, $m=0, 1, \ldots, M-1$. According to DOCSIS 3.1 specifications as in Document 8 above, there are guard bands at both ends of the allocated spectrum that cannot be used for data transmission. This restricts the location of the pilot sub-carriers, which are usually centered at the middle of the allocated spectrum. Denote the vector of pilot sub-carrier indexes as $S=[S(0), S(1), \ldots, S(M-1)]$, where the elements are related by $$S(m)=S(0)+mK, \quad m=0,1,\ldots,M-1, \qquad (1)$$

where $S(0)$ is the "start" sub-carrier and K is sub-carrier "skipping" factor.

The OFDMA transmitter employs an IDFT module of size N for modulation. The standard IDFT/DFT is not used here, but rather the transform pair specified in DOCSIS 3.1, where the subcarrier indexing is shifted by $-N/2$ sub-carriers. Using the DOCSIS 3.1 IDFT, the transmitted time-domain samples are written as $$x_d[n] = \frac{1}{\sqrt{N}} \sum_{m=0}^{M-1} X[m] \exp\left( \frac{j2\pi(S(m) - N/2)n}{N} \right), \qquad (2)$$

where $n=0, 1, \ldots, N-1$ denotes the sample index. To avoid inter-symbol interference (ISI), a cyclic prefix (CP) consisting of $N_{CP}$ samples is prefixed to the OFDMA symbol. After performing parallel to serial (P/S) conversion, the time-domain samples are serially passed through a DAC clocked at sampling rate $F_s$ and filtered with an image rejection filter to generate the continuous-time signal. Assuming ideal digital to analog (D/A) conversion, the continuous-time signal can be expressed as $$x_a(t) = \frac{1}{\sqrt{N}} \sum_{m=0}^{M-1} X[m] \exp\left( \frac{j2\pi(S(m) - N/2)(t - T_g)}{NT_s} \right), \qquad (3)$$

$$0 \le t \le NT_s + T_g,$$

where $T_s = 1/F_s$ is the sampling period and $T_g$ is guard interval in seconds. $T_g$ is the duration of the cyclic prefix which is $N_{CP}T_s$. It is obvious that after the cyclic prefix is inserted $x_a(t) = x_a(t+NT_s)$, $\forall t \in [0, T_g]$. In general, the validity of (3) depends on how well the up-conversion is performed.

A channel in a coaxial cable distribution network consists of many paths created by impedance mismatches among terminals and ports of devices that make up the network. Each path is characterized by a gain factor $\alpha_i$ and an associated delay $\epsilon_i$ normalized to sampling period $T_s$. Without loss of generality, $\epsilon_0$ is taken to be 0 and $\epsilon_i$ is the delay of path $i^{th}$ relative to the delay of path $0^{th}$. The impulse response of the baseband-equivalent of the multipath channel is given by $$h_c(t) = \alpha_0 \delta(t) + \sum_{i=1}^{L-1} \alpha_i \delta(t - \epsilon_i T_s), \qquad (4)$$

where δ is the Dirac delta function. Furthermore, the parameter L is the number of paths in the multipath channel. The channel's delay spread in seconds is $\epsilon_{max} T_s$, where $$\epsilon_{max} = \max_{i=1,\ldots,L-1} \epsilon_i$$

which is the delay of the longest multipath component relative to the first.

The continuous time signal received at the receiver is the convolution of the transmitted signal and the impulse response of the multipath channel. That is $$y_a(t) = \int_0^\infty h_c(\theta) x_a(t - \tau_0 T_s - \theta) d\theta + w(t) \qquad (5)$$

$$= \alpha_0 x_a(t - \tau_0 T_s) + \sum_{i=1}^{L-1} \alpha_i x_a(t - \tau_0 T_s - \epsilon_i T_s) + w(t),$$

where $w(t)$ is a zero-mean AWGN noise process and $\tau_0$ is the timing offset (normalized to sampling period $T_s$) introduced by error in detecting the start time of the received OFDMA symbol. There are many coarse timing estimation techniques, as set out in Document 9 above, that can detect the start time of the received OFDMA frame. With coarse timing, the detection error can be a few samples.

Figure 2:
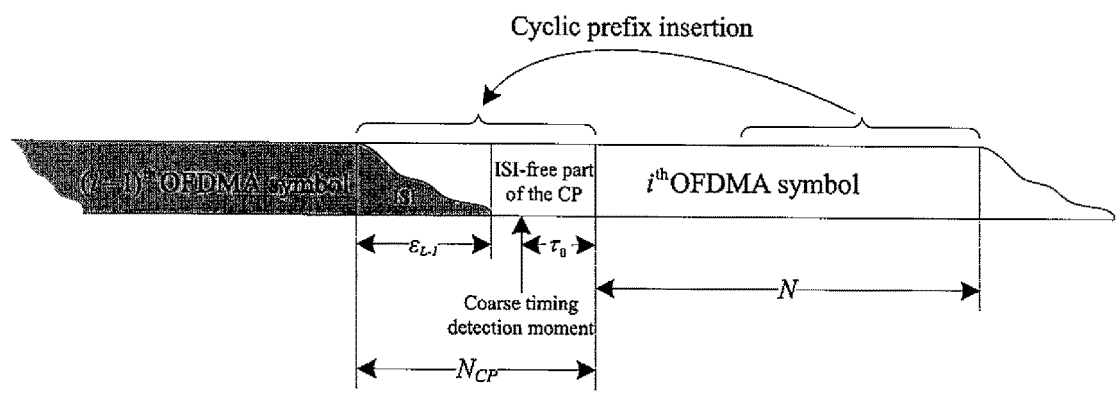
FIG. 2 is an illustration of how an OFDM cyclic prefix is used to allow ISI-free operation.

Assume a well designed system where the length of the cyclic prefix is greater than the channel's delay spread, i.e., $T_g > \epsilon_{max} T_s$, as illustrated in FIG. 2. To ensure the DFT output is ISI-free, the error in the coarse timing detection must not exceed the slack in the CP. This places the following constraint on coarse timing error:

$$0 \leq \tau_0 \leq N_{CP} - \epsilon_{max}, \qquad (6)$$

where $\tau_0$ is the error in coarse timing in samples. By defining $\tau_i = \epsilon_i + \tau_0$, i=1, 2, ..., L−1, the timing error can be incorporated into the base-band channel to get the more realistic impulse response given by:

$$h_\tau(t) = \sum_{i=0}^{L-1} \alpha_i \delta(t - \tau_i T_s). \qquad (7)$$

Then (5) simplifies to $$y_a(t) = \sum_{i=0}^{L-1} \alpha_i x_a(t - \tau_i T_s) + w(t), \; 0 \leq t \leq NT_s + T_g. \qquad (8)$$

The continuous time signal is band-limited and digitally sampled at the receiver with the sampling rate $F_s$. After coarse timing detection is performed, the cyclic prefix is removed. The discrete-time samples after cyclic prefix removal are given by $$y_d[n] = y_a(t)|_{t=nT_s+T_g} = \sum_{i=0}^{L-1} \alpha_i x_a(nT_s + T_g - \tau_i T_s) + w[n], \qquad (9)$$

$$n = 0, 1, \ldots, N-1,$$

where w[n] is w(t) sampled at $t=nT_s+T_g$ after it has been band-limited. w[n] is complex white Gaussian noise with zero mean and variance $\sigma_w^2$. To recover the data, an N-point DFT block transforms the time-domain sequence back to the frequency-domain:

$$Y[m] = \frac{1}{\sqrt{N}} \sum_{n=0}^{N-1} y_d[n] \exp\left(\frac{-j2\pi(S(m)-N/2)n}{N}\right) \qquad (10)$$

$$= \frac{1}{N} \sum_{n=0}^{N-1} \sum_{i=0}^{L-1} \alpha_i \sum_{k=0}^{M-1} X[k] \exp\left(\frac{j2\pi(S(k)-N/2)(nT_s - \tau_i T_s)}{NT_s}\right) \times$$

$$\exp\left(\frac{-j2\pi(S(m)-N/2)n}{N}\right) + W[m], \; m = 0, 1, \ldots, M-1,$$

where $$W[m] = \sum_{n=0}^{N-1} \frac{w[n]}{\sqrt{N}} \exp\left(\frac{-j2\pi(S(m)-N/2)n}{N}\right), \qquad (11)$$

is complex Gaussian noise with zero mean and variance $\sigma_w^2$. Then $$Y[m] = \frac{1}{N} \sum_{k=0}^{M-1} X[k] \sum_{i=0}^{L-1} \alpha_i \sum_{n=0}^{N-1} \exp\left(\frac{j2\pi(S(k)-S(m))n}{N}\right) \times \qquad (12)$$

$$\exp\left(\frac{-j2\pi(S(m)-N/2)\tau_i}{N}\right) + W[m]$$

$$= X[m] \sum_{i=0}^{L-1} \alpha_i \exp\left(\frac{-j2\pi(S(m)-N/2)\tau_i}{N}\right) + W[m]$$

$$= X[m]H[m] + W[m],$$

where H[m] is the multipath channel's frequency response at sub-carrier S(m), given as $$H[m] = \sum_{i=0}^{L-1} \alpha_i \exp\left(\frac{-j2\pi(S(m)-N/2)\tau_i}{N}\right), \qquad (13)$$

With the input/output model of (12), the signal-to-noise ratio (SNR) of the received signal is defined as $$SNR = \frac{\mathbb{E}\{|X[m]H[m]|^2\}}{\mathbb{E}\{|W[m]|^2\}} = \frac{\sum_{i=0}^{L-1} |\alpha_i|^2}{\sigma_w^2}. \qquad (14)$$

The task of channel estimation is to obtain the frequency response of the entire channel, which is ideally given as $$F[k] = \sum_{i=0}^{L-1} \alpha_i \exp\left(\frac{-j2\pi(k-N/2)\tau_i}{N}\right), \; k = 0, 1, \ldots, N-1 \qquad (15)$$

from known values of X[m] and observed values of Y[m]. Since F[k] is a function of the 2L unknown parameters $\{\alpha_i, \tau_i\}_{i=0}^{L-1}$, an estimate of F[k] is obtained from estimates of the 2L unknown parameters. Conventional methods estimate M values of H[m] and then interpolate between them to get the entire frequency response, F[k]. The invention presents a novel iterative algorithm to obtain 2L values of $\{\alpha_i, \tau_i\}_{i=0}^{L-1}$. As long as 2L≪M, it will be shown that estimating $\{\alpha_i, \tau_i\}_{i=0}^{L-1}$ directly provides a better estimate of F[k].

The iterative algorithm assumes a multipath channel that has a finite number of paths and is designed to estimate the channel parameters, which are time delays $\tau_i$ and amplitudes $\alpha_i$, i=0, 1, ..., L−1, of the paths. The estimated parameters, denoted as $\hat{\tau}_i$ and $\hat{\alpha}_i$ can be used to obtain the frequency response of the channel with the following equation:

$$\hat{F}_{ICE}[k] = \sum_{i=0}^{L-1} \hat{\alpha}_i \exp\left(\frac{-j2\pi(k-N/2)\hat{\tau}_i}{N}\right), \qquad (16)$$

$$k = 0, 1, \ldots, N-1.$$

Figure 3:
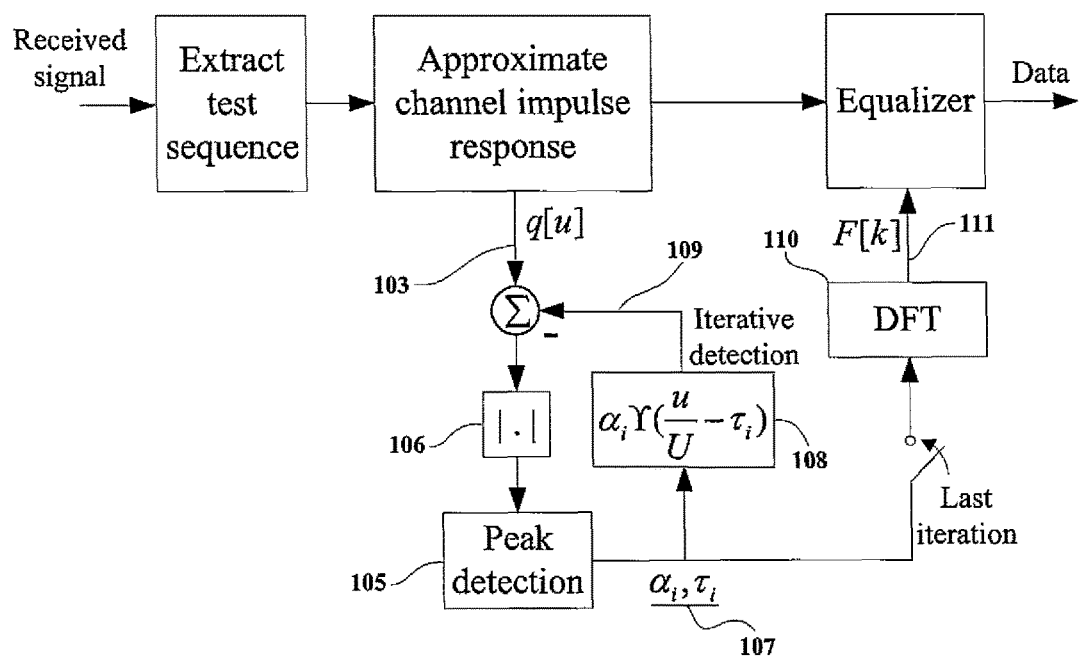
FIG. 3 is the high-level block diagram of the iterative channel estimation technique.

FIG. 3 illustrates the high-level block diagram of the iterative channel estimation technique. The proposed iterative channel estimation technique starts by calculating an initial rough estimation of the multipath channel's impulse response (103) using the received version of the test sequence Y[m]. Specifically, given the known preamble sequence X[m], the estimator performs an upsampling inverse Fourier transform on $$\frac{Y[m]}{X[m]}.$$

The transform has a length of NU/K, where U is an upsampling factor which controls the resolution of the resulting time domain vector q[u], given as $$q[u] = \frac{1}{M} \sum_{m=0}^{M-1} \frac{Y[m]}{X[m]} \exp\left(\frac{j2\pi(m + (S(0) - N/2)/K)u}{NU/K}\right). \quad (17)$$

Note that U is not necessarily an integer, but rather a number that is chosen to make NU/K an integer. One suggestion is to make NU/K a power of two so that the complexity of (17) can be reduced through the use of Fast Fourier Transform algorithm. (17) can be simplified as follows:

$$q[u] = \underbrace{\frac{1}{M} \sum_{m=0}^{M-1} H[m] \exp\left(\frac{j2\pi(m + (S(0) - N/2)/K)u}{NU/K}\right)}_{b[u]} + \rho[u] \quad (18)$$

$$= b[u] + \rho[u], \quad u = 0, 1, \ldots, NU/K - 1,$$

where $\rho[u]$ is the AWGN noise component given by $$\rho[u] = \frac{1}{M} \sum_{m=0}^{M-1} \tilde{W}[m] \exp\left(\frac{j2\pi(m + (S(0) - N/2)/K)u}{NU/K}\right), \quad (19)$$

which has zero mean and $$\text{variance } \sigma_\rho^2 = \frac{\sigma_w^2}{M}.$$

Since M≤N/K, the complexity of (17) is equivalent to an $$\frac{NU}{K}\text{-point } IDFT.$$

The signal component of (17) can be expressed in a more meaningful form as $$b[u] = \frac{1}{M} \sum_{m=0}^{M-1} \sum_{i=0}^{L-1} \alpha_i \exp\left(\frac{-j2\pi(S(m) - N/2)\tau_i}{N}\right) \exp\left(\frac{j2\pi(m + (S(0) - N/2)/K)u}{NU/K}\right) \quad (20)$$

$$= \sum_{i=0}^{L-1} \alpha_i \frac{1}{M} \sum_{m=0}^{M-1} \exp\left(\frac{-j2\pi(S(0) + mK - N/2)\tau_i}{N}\right) \exp\left(\frac{j2\pi(mK + S(0) - N/2)u/U}{N}\right)$$

$$= \sum_{i=0}^{L-1} \alpha_i \frac{1}{M} \exp\left(\frac{j2\pi(S(0) - N/2)(u/U - \tau_i)}{N}\right) \sum_{m=0}^{M-1} \exp\left(\frac{j2\pi mK(u/U - \tau_i)}{N}\right)$$

$$= \sum_{i=0}^{L-1} \alpha_i \frac{1}{M} \exp\left(\frac{j2\pi(S(0) - N/2)(u/U - \tau_i)}{N}\right) \frac{\exp\left(\frac{j2\pi MK(u/U - \tau_i)}{N}\right) - 1}{\exp\left(\frac{j2\pi K(u/U - \tau_i)}{N}\right) - 1}$$

$$= \sum_{i=0}^{L-1} \alpha_i \exp\left(\frac{j\pi(2S(0) - N + (M-1)K)(u/U - \tau_i)}{N}\right) \underbrace{\frac{\sin(\pi(u/U - \tau_i)MK/N)}{M\sin(\pi(u/U - \tau_i)K/N)}}_{\Upsilon(\frac{u}{U} - \tau_i)}$$

$$= \sum_{i=0}^{L-1} \alpha_i \Upsilon\left(\frac{u}{U} - \tau_i\right), \quad u = 0, 1, \ldots, \langle NU/K \rangle - 1,$$

where b[u] is represented as a summation of several channel path kernel functions, $\gamma(\bullet)$, that are delayed by $\tau_i$ and scaled in amplitude by $\alpha_i$. Each $\gamma(\bullet)$ function represents a path in the channel.

The shape of the $\gamma(\bullet)$ function is more clear when it is expressed as $$\Upsilon(x) = \exp\left(\frac{j\pi\Delta x}{N}\right) psinc\left(\frac{xK}{N}, M\right), \quad (21)$$

where $\Delta = 2S(0) - N + (M-1)K$ and psinc(x, M) is the Dirichlet or periodic sine function defined as $$psinc(x, M) = \begin{cases} \frac{\sin(\pi M x)}{M \sin(\pi x)}, & x \notin \mathbb{Z} \\ (-1)^{x(M-1)}, & x \in \mathbb{Z} \end{cases} \quad (22)$$

Figure 4:
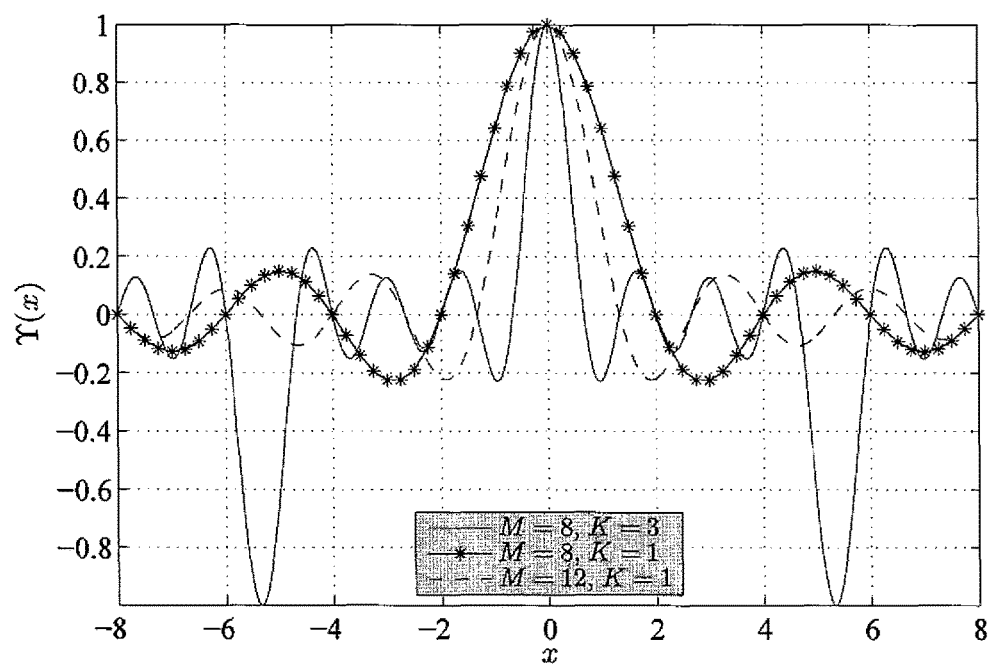
FIG. 4 is an example of channel path kernel function γ, taken with N=16, Δ=0 and various values for parameters M and K, as indicated on the Figure.

The $\gamma(x)$ function has zero-crossings at integer multiples of N/(MK), and therefore the width of the main lobe is 2N/(MK), which is inversely proportional to KM, as illustrated in FIG. 4. This relatively narrow main lobe ensures the magnitude of $\gamma(x)$ has a sharp peak at x=0. Furthermore, the peak value of $\gamma(x)$ is 1.

The iterative channel estimation technique centers on peak detection (105) of q[u]. Without loss of generality, the path indices are defined based on path strength such that $$|\alpha_0| \geq |\alpha_1| \geq \ldots \geq |\alpha_{L-1}|. \quad (23)$$

Provided U is chosen large enough for $$\left|\frac{\langle \tau_i U \rangle}{U} - \tau_i\right| < \left|\frac{\langle \tau_j U \rangle}{U} - \tau_i\right|, \forall j \neq i, i = 0, 1, 2, \ldots, L-1, \quad (24)$$

where $\langle \cdot \rangle$ indicates' rounding, then from (21), (23) and (24) it follows that $$\left|\alpha_0 \Upsilon\left(\frac{\langle \tau_0 U \rangle}{U} - \tau_0\right)\right| > \left|\alpha_1 \Upsilon\left(\frac{\langle \tau_0 U \rangle}{U} - \tau_1\right)\right|, \forall i = 1, 2, \ldots, L-1. \quad (25)$$

This indicates $\alpha_0 \gamma(\langle \tau_0 U \rangle/U - \tau_0)$ is the dominant magnitude contributor to $b[\langle \tau_0 U \rangle]$. The estimates of $\alpha_i$ and $\tau_i$ (107) can be found iteratively starting with a rough approximation of the parameters of the first path, $\alpha_0$ and $\tau_0$ as follows:

$$u_0^{[1]} = \underset{u=0,1,\ldots,NU/K-1}{\mathrm{argmax}} |q[u]|, \quad (26)$$

$$\hat{\tau}_0^{[1]} = u_0^{[1]}/U \text{ and } \hat{\alpha}_0^{[1]} = q[u_0^{[1]}],$$

where the super script [1] indicates that the value was found on the first iteration. Rough estimates of the parameters of the second path can then be generated by subtracting from q[u] the estimated contribution of the first path, $\hat{\alpha}_0^{[1]} \gamma(u/U - \hat{\tau}_0^{[1]})$ (108), given by:

$$u_1^{[1]} = \underset{u=0,1,\ldots,NU/K-1}{\mathrm{argmax}} |q[u] - \hat{\alpha}_0^{[1]} \Upsilon(u/U - \hat{\tau}_0^{[1]})|, \quad (27)$$

$$\hat{\tau}_1^{[1]} = u_1^{[1]}/U \text{ and } \hat{\alpha}_1^{[1]} = q[u_1^{[1]}] - \hat{\alpha}_0^{[1]} \Upsilon(u_1^{[1]}/U - \hat{\tau}_0^{[1]}).$$

Similarly, rough estimates for $\alpha_i$, $\tau_i$, i=2, 3, ..., L−1, are found using $$u_i^{[1]} = \underset{u=0,1,\ldots,NU/K-1}{\mathrm{argmax}} \left|q[u] - \sum_{k=0}^{i-1} \hat{\alpha}_k^{[1]} \Upsilon(u/U - \hat{\tau}_k^{[1]})\right|, \quad (28)$$

$$\hat{\tau}_i^{[1]} = u_i^{[1]}/U \text{ and } \hat{\alpha}_i^{[1]} = q[u_i^{[1]}] - \sum_{k=0}^{i-1} \hat{\alpha}_k^{[1]} \Upsilon(u_i^{[1]}/U - \hat{\tau}_k^{[1]}).$$

After a set of rough estimates are obtained, the estimates for $\alpha_0$ and $\tau_0$ can be improved by removing from q[u] the estimated contributions from paths 1 to L−1. The improved estimates of $\alpha_0$ and $\tau_0$ in this $2^{nd}$ iteration are given by $$u_0^{[2]} = \underset{u=0,1,\ldots,NU/K-1}{\mathrm{argmax}} \left|q[u] - \sum_{k=1}^{L-1} \hat{\alpha}_k^{[1]} \Upsilon(u/U - \hat{\tau}_k^{[1]})\right|, \quad (29)$$

$$\hat{\tau}_0^{[2]} = u_0^{[2]}/U \text{ and } \hat{\alpha}_0^{[2]} = q[u_0^{[2]}] - \sum_{k=1}^{L-1} \hat{\alpha}_k^{[1]} \Upsilon(u_0^{[2]}/U - \hat{\tau}_k^{[1]}).$$

In a similar manner, the better estimates of $\alpha_0$ and $\tau_0$ can be used to produce better estimates of $\alpha_1$ and $\tau_1$. The estimates can be continually improved in this iterative fashion. Specifically, the impulse response of path i on iteration v is approximated by (109)

$$q_i^{[v]}[u] \overset{def}{=} q[u] - \sum_{l=0}^{i-1} \hat{\alpha}_l^{[v]} \Upsilon(u/U - \hat{\tau}_l^{[v]}) - \sum_{k=i+1}^{L-1} \hat{\alpha}_k^{[v-1]} \Upsilon(u/U - \hat{\tau}_k^{[v-1]}) \quad (30)$$

$$\approx \alpha_i \Upsilon(u/U - \tau_i),$$

and the improved estimates of $\alpha_i$ and $\tau_i$ are given by $$u_i^{[v]} = \underset{u=0,1,\ldots,NU/K-1}{\mathrm{argmax}} |q_i^{[v]}[u]|, \quad (31)$$

$$\hat{\tau}_i^{[v]} = u_i^{[v]}/U \text{ and } \hat{\alpha}_i^{[v]} = q_i^{[v]}[u_i^{[v]}].$$

After several iterations the estimates reach, or at least nearly reach, steady state values, which are denoted as $\hat{\alpha}_i$ and $\hat{\tau}_i$. These steady state values are processed by a Fourrier transform (110) as described in (16) to obtain the frequency response of the channel (111).

These steady state values are used in (16) to obtain the estimated frequency response of the channel.

The accuracy of the aforementioned approximation is significantly affected by the error in i. The proposed approach ideally estimates $\hat{\tau}_i = \langle \tau_i U \rangle/U$. Thus the estimation error in the worst case could be 0.5/U, i.e., $|\hat{\tau}_i - \tau_i| \leq 0.5/U$. Obviously, larger U reduces the error at the cost of increasing the estimator's complexity. Furthermore, the error in $\hat{\tau}_i$ has the corresponding effect of diminishing the magnitude of $\hat{\alpha}_i$ by up to $|\gamma(0.5/U)|$. For the case of M=N, the reduction can be as much as −4 dB, −0.9 dB and −0.2 dB for U=1, U=2 and U=4, respectively.

Figure 5:
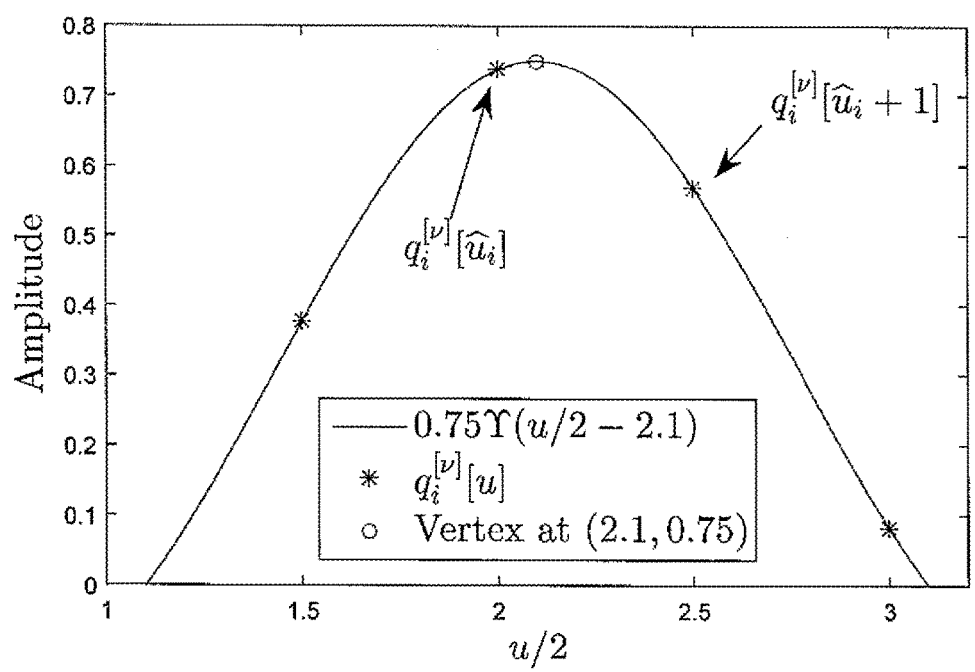
FIG. 5 is an example of the use of interpolation with U=2 to estimate a channel path delay. The channel path kernel function T is obtained with M=N=32 and Δ=0.

The estimate for $\tau_i$ used in (31) is rather crude. The accuracy of this estimator, which simply rounds the argument of (31) to the sample nearest to the peak, can be improved by interpolating between the two samples nearest the peak, thus eliminating the rounding error, as shown in FIG. 5.

There are several ways of interpolating between two samples. The method used here is to find the parameters $\bar{\tau}_i$ and $\bar{\alpha}_i$ that force $\bar{\alpha}_i \gamma(\hat{u}_i/U - \bar{\tau}_i)$ and $\bar{\alpha}_i \gamma((\hat{u}_i+1)/U - \bar{\tau}_i)$ to equal the samples on each side of the peak of the argument, where the pair of indices $u=\hat{u}_i$ and $u=\hat{u}_i+1$ can be found, or at least estimated as $$\hat{u}_{i,max} = \underset{u=0,1,\ldots,NU/K-1}{\mathrm{argmax}} |q_i^{[v]}[u]|, \quad (32)$$

$$\hat{u}_i = \begin{cases} \hat{u}_{i,max}, & \text{if} |q_i^{[v]}[\hat{u}_{i,max}+1]| \geq |q_i^{[v]}[\hat{u}_{i,max}-1]|, \\ \hat{u}_{i,max} - 1, & \text{otherwise.} \end{cases}$$

As shown in FIG. 4, the $\gamma(\cdot)$ function has multiple extrema. For the interpolation to yield a unique and accurate solution, the two samples used must be on opposite sides of the main lobe peak, i.e. $\hat{u}_i/U \leq \bar{\tau}_i \leq (\hat{u}_i+1)/U$. Under this constraint, the solutions for $\bar{\alpha}_i$ and $\bar{\tau}_i$ can be found by simultaneously solving $$\begin{cases} \bar{\alpha}_i \Upsilon(\hat{u}_i/U - \bar{\tau}_i) = q_i^{[v]}[\hat{u}_i], \\ \bar{\alpha}_i \Upsilon((\hat{u}_i+1)/U - \bar{\tau}_i) = q_i^{[v]}[\hat{u}_i+1], \\ \hat{u}_i/U \leq \bar{\tau}_i \leq (\hat{u}_i+1)/U. \end{cases} \quad (33)$$

The solution for $\bar{\tau}_i$ from (33) is given by $\bar{\tau}_i=(\hat{u}_i+\theta_i)/U$, where $\theta_i$ is the root of the following equation:

$$\frac{q_i^{[v]}[\hat{u}_i]}{q_i^{[v]}[\hat{u}_i+1]} = \frac{\Upsilon(-\theta_i/U)}{\Upsilon((1-\theta_i)/U)} = \exp\left(\frac{-j\pi\Delta}{NU}\right)\frac{\sin\left(\frac{\pi MK\theta_i}{NU}\right)\sin\left(\frac{\pi K(1-\theta_i)}{NU}\right)}{\sin\left(\frac{\pi K\theta_i}{UN}\right)\sin\left(\frac{\pi MK(1-\theta_i)}{UN}\right)}, \quad (34)$$

where $\theta_i \in [0, 1]$. Since $\sin(x) > 0 \, \forall x \in (0, \pi)$, equation (34) can be simplified to $$\frac{|q_i^{[v]}[\hat{u}_i]|}{|q_i^{[v]}[\hat{u}_i+1]|} = \frac{\sin\left(\frac{\pi MK\theta_i}{NU}\right)\sin\left(\frac{\pi K(1-\theta_i)}{NU}\right)}{\sin\left(\frac{\pi K\theta_i}{UN}\right)\sin\left(\frac{\pi MK(1-\theta_i)}{UN}\right)} = \Gamma(\theta_i). \quad (35)$$

Denoting $$\kappa = \frac{|q_i^{[v]}[\hat{u}_i]|}{|q_i^{[v]}[\hat{u}_i+1]|},$$

$\theta_i$ can be found as $$\theta_i = \Gamma^{-1}(\kappa), 0 \le \theta_i \le 1. \quad (36)$$

Solving (36) in real-time is possible, but very costly due to the complexity of $\Gamma^{-1}(\bullet)$. Moreover, the precision of the computation must be very high when $\theta_i$ is close to 0 or 1, i.e., when the denominator of (35) approaches zero.

Figure 6:
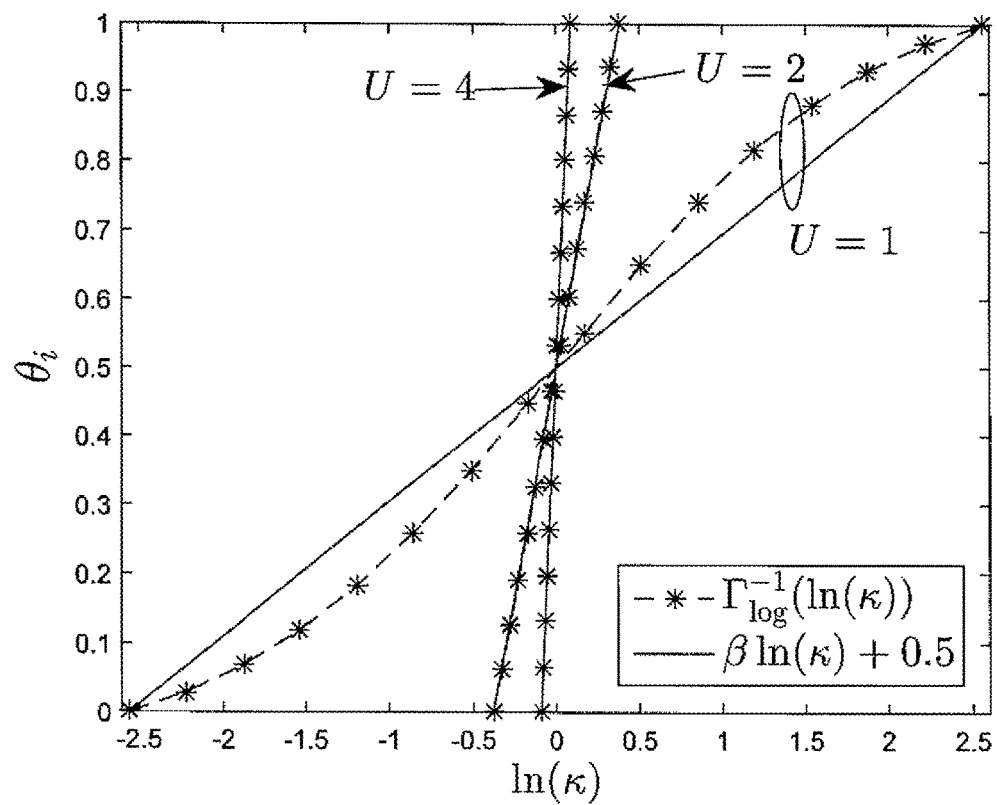
FIG. 6 is an illustration of the error introduced by log-domain interpolation when estimating the channel path delay. Other parameters are selected as M=1900, K=1, N=2048 and U=1, 2, 4.

Fortunately, (36) can be modified to yield a hardware friendly form. Since $\kappa = e^{ln(\kappa)}$, $\theta_i$ can be expressed as the function of $\ln(\kappa)$ defined as $\Gamma_{log}^{-1}(\ln(\kappa)) = \Gamma^{-1}(e^{ln(\kappa)}) = \Gamma^{-1}(\kappa)$. The simplicity of the logarithmic form is illustrated in FIG. 6, where $\theta_i$ is plotted as a function of $\ln(\kappa)$ for 3 values of U. It is apparent from FIG. 6 that for $U \ge 2$, $\Gamma_{log}^{-1}(\bullet)$ is nearly linear and can be approximated by $\Gamma_{log}^{-1}(\ln(\kappa)) \approx \beta \ln(\kappa) + 0.5$, where $\beta$ is a coefficient that can be pre-computed from system parameters K, M, N and U as $$\beta = \frac{-0.5}{\ln\left(\sin\left(\frac{\pi MK}{NU}\right)/M\right) - \ln\left(\sin\left(\frac{\pi K}{NU}\right)\right)}. \quad (37)$$

$\theta_i$ can then be approximated by $$\theta_i \approx \beta \ln(t) + 0.5 = \beta(\ln(|q_i^{[v]}[\hat{u}_i]|) - \ln(|q_i^{[v]}[\hat{u}_i+1]|)) + 0.5, \quad (38)$$

for $U \ge 2$. Note that (38) does not require a division operation, and is therefore significantly more hardware friendly than (36).

There are two ways to find the echo strength $\bar{\alpha}_i$. The straight forward approach is to substitute $\theta_i$ into (33), yielding the following expression:

$$\bar{\alpha}_i = \frac{q_i^{[v]}[\hat{u}_i]}{\Upsilon(-\theta_i/U)}. \quad (39)$$

Although (39) is computationally simple, it amplifies the noise and ISI present in $q_i^{[v]}[\hat{u}_i]$. In the worst-case scenario, this results in the noise and ISI being increased by a factor of $|\gamma(1/U)^{-1}|$. This factor decreases as the upsampling factor U increases. For the system parameters shown in FIG. 6, the worst case amplification values are 11.12 dB, 1.66 dB and 0.39 dB for U=1, 2 and 4, respectively. Alternatively, $\bar{\alpha}_i$ can be found as:

$$\bar{\alpha}_i = \frac{1}{M}\sum_{m=0}^{M-1}\hat{H}_{LS}[m]\exp\left(\frac{j2\pi(S(m)-N/2)\bar{\tau}_i}{N}\right) - \sum_{k=0,k\ne i}^{L-1}\bar{\alpha}_k\Upsilon(\bar{\tau}_i-\bar{\tau}_k), \quad (40)$$

which is computationally more expensive than (39), but it prevents the noise and interference amplification effect. Consequently, for $U \le 2$, it is advisable to use (40) in order to avoid severe performance degradation due to noise amplification. For $U > 2$, the amplification effect is minimal, so the more computationally efficient (39) is preferred.

The ICE technique does not require any channel information, except for an initial estimation of the number of channel paths, denoted as $\hat{L}$, which must be determined before performing the iterative channel estimation. In reality, the parameter L in (20) should be replaced by $\hat{L}$ so that the ICE algorithm will estimate $2\hat{L}$ channel parameters, $\{\alpha_i, \tau_i\}_{i=0}^{\hat{L}-1}$, instead of 2L. Therefore it is reasonable to expect the best performance achieved when $\hat{L}=L$.

In some cases, such as CATV networks, the plant is maintained to limit the number of dominant echo paths. For example, networks that use DOCSIS 3.0 equipment are restricted to $L \le 4$ while networks that use DOCSIS 3.1 equipment are restricted to $L \le 2$. Therefore it is reasonable to fix parameter $\hat{L}=2$ in equipment used in DOCSIS 3.1 upstream transmission.

Although the ICE technique was initially designed for DOCSIS 3.1 systems, it applies to general OFDMA systems, where the parameter L is not so constrained and the initial guesstimation of $\hat{L}$ affects the channel estimation performance. In particular, with the proposed ICE technique, if the number of paths in the channel is under-detected, i.e. $\hat{L}<L$, there will be performance degradation as the model is unable to compensate for the least significant channel paths. If the number of path is over-detected, i.e. $\hat{L}>L$, the ICE technique would interpret noise samples as channel paths. Since the power of noise is much less than the power of an echo, e.g. $|\alpha_{L-1}|^2 >> \sigma_n^2$, performance degradation due to over-detection is generally less than the degradation caused by under-detection. Therefore, it is better to error on the side of over-detection.

Moreover, the performance degradation caused by over-detection can be mitigated as the significant power difference between echoes and noise can be exploited to suppress the over-detected paths. In particular, a threshold can be employed to differentiate the channel paths from the noise. The thresholding process replaces (39) and (40) with:

$$\overline{\alpha}_i = \begin{cases} 0, & \text{if } |q_i^{[v]}[\hat{u}_i]| \leq \lambda_T \\ \frac{1}{M}\sum_{m=0}^{M-1}\hat{H}_{LS}[m]\exp\left(\frac{j2\pi(S(m)-N/2)\tau_i}{NT_s}\right) - \sum_{k=0,k\neq i}^{L-1}\overline{\alpha}_k \Upsilon(\overline{\tau}_i - \overline{\tau}_k), & \text{if } |q_i^{[v]}[\hat{u}_i]| > \lambda_T \text{ and } U \leq 2, \\ q_i^{[v]}[\hat{u}_i]/\Upsilon(-\theta_i/U), & \text{otherwise} \end{cases} \quad (41)$$

where $\lambda_T$ is the threshold level. With any threshold level decision, there is always some probability of a false alarm where a noise sample is declared as an echo. The threshold can be set to obtain a false alarm probability of $P_e$, using $$\lambda_T = \sqrt{\frac{-\sigma_p^2}{\ln(P_e)}} = \sqrt{\frac{-\sigma_w^2}{M\ln(P_e)}}. \quad (42)$$

Simulation results show that the estimation performance is not particularly sensitive to threshold level $\lambda_T$. A reasonable threshold is obtained by setting the false alarm probability to $P_e=10^{-3}$.

The iterative channel detection procedure is summarized below:
1) Perform an $$\frac{NU}{K}\text{-point IDFT}$$

on $\hat{H}_{LS}[m]$ to obtain a transformation of the channel response, q[u], as given in (17).
2) Conservatively guesstimate a value for L based on the assumed characteristics of the channel, making sure $\hat{L} \geq L$.
3) Initialize the iteration number and channel path parameters, i.e. $v=1$ and $\overline{\alpha}_i^{[0]}=\hat{\tau}_i^{[0]}=0$; $i=0, 1, \ldots, \hat{L}-1$.
4) Subtract the effect of the estimated channel paths from q[u] using (30) with $\overline{\tau}_i$ and $\overline{\alpha}_i$ in place of $\hat{\tau}_i$ and $\hat{\alpha}_i$.
5) Estimate $\hat{u}_i^{[v]}$ as in (32) then use (36) to calculate $\overline{\tau}_i^{[v]}$ if U=1. If U>1, use (38) instead to simplify the computation.
6) Use (41) to obtain $\overline{\alpha}_i^{[v]}$.
7) Repeat steps 4) to 6) $\hat{L}$ times, starting with i=0 and ending with i=$\hat{L}$-1 to complete one iteration.
8) Increase v by 1 and repeat from step 4). Stop the process after a preset number of iterations.
9) Finally, the transfer function of the multipath channel can be computed similarly to (16) with channel parameters $\overline{\alpha}_i$ and $\overline{\tau}_i$ obtained from the last iteration.

The performance of the proposed channel estimation algorithm is investigated. At first, the single echo channel model as set out in Document 8 above is considered, which fixes $\hat{L}=L=2$. Coarse timing error $\tau_0$ is modeled as a random variable that is uniformly distributed between 0 and 10, i.e. $\tau_0 \sim U(0,10)$. The echo delay in seconds, i.e. $\epsilon_1 T_s$, is uniformly distributed between 0 and 0.5 µs. The power of the micro-reflection is −16 dBc relative to the main path, which is the worst case specified in DOCSIS 3.1. The sampling rate of the system is $F_s=102.4$ MHz. The signal is generated using an N=2048 point IFFT, and has M=1900 pilots indexed by S(m)=m+74, m=0, 1, . . . , 1899 (no sub-carrier skipping), which leaves 74 unused carriers as guard bands at both ends of the spectrum.

Figure 7:
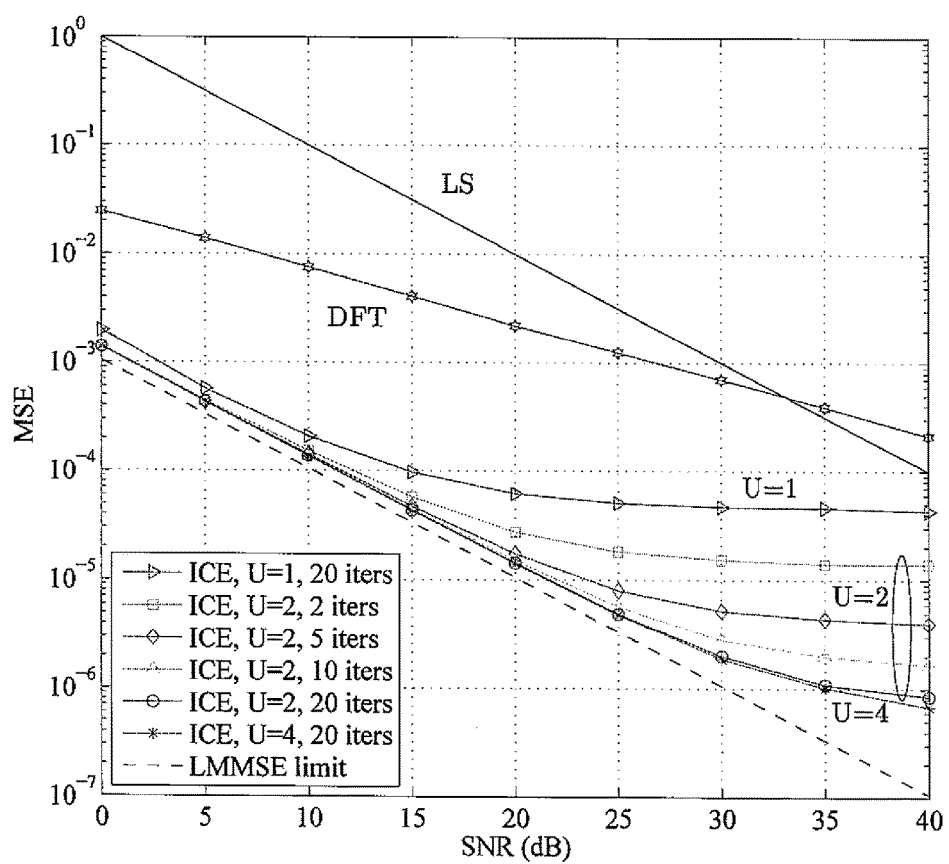
FIG. 7 shows the performance of the proposed technique for 1 echo DOCSIS 3.1 channel model.

FIG. 7 presents the performance of the proposed iterative channel estimator (ICE) in a DOCSIS 3.1 channel and compares it with the performance of the conventional estimators discussed previously. It can be seen that performance of the simple LS approach (no priori channel information) is the worst among all, followed by the DFT method. Despite having superior performance over the LS method in the low SNR region, the performance of the DFT method is worse than the LS method for SNR greater than 33 dB. It is apparent that 33 dB marks the location where the leakage power in the estimation is greater than noise power and becomes the main source of performance degradation for the DFT method.

Performance of the ICE technique is illustrated for three up-sampling factors: U=1, U=2 and U=4. The ICE method clearly outperforms both the LS and DFT techniques, even with U=1. However, with U=1, the ICE method hits an error floor of $4 \cdot 10^{-5}$ for SNRs above 20 dB that can not be reduced by increasing the number of iterations.

When increasing the up-sampling factor to U=2, it can be seen that the error floor depends on the number of iterations. As can be seen in FIG. 7, there is considerable improvement between 2 and 20 iterations. In particular, the MSE level at 20 iterations is 10 times lower than that achieved with 2 iterations. However, only marginal performance gains are obtained by exceeding 20 iterations. Interestingly, a further increase of the up-sampling factor to 4 has little effect on the algorithm performance. Specifically, the MSE level with U=4 and 20 iterations is almost identical to that with U=2 and 20 iterations. The simulation results provide strong evidence that an up-sampling factor of U=2 and 20 iterations should be used.

It can be seen that the proposed algorithm outperforms the conventional methods, especially in the low-SNR region, where the ICE estimator is 30 dB better than the LS. In addition, the performance of the ICE asymptotically approaches that of the LMMSE, but does not need apriori knowledge of the auto-covariance of the channel. Furthermore, the ICE method requires only a single OFDMA symbol to achieve this level of performance.

Figure 8:
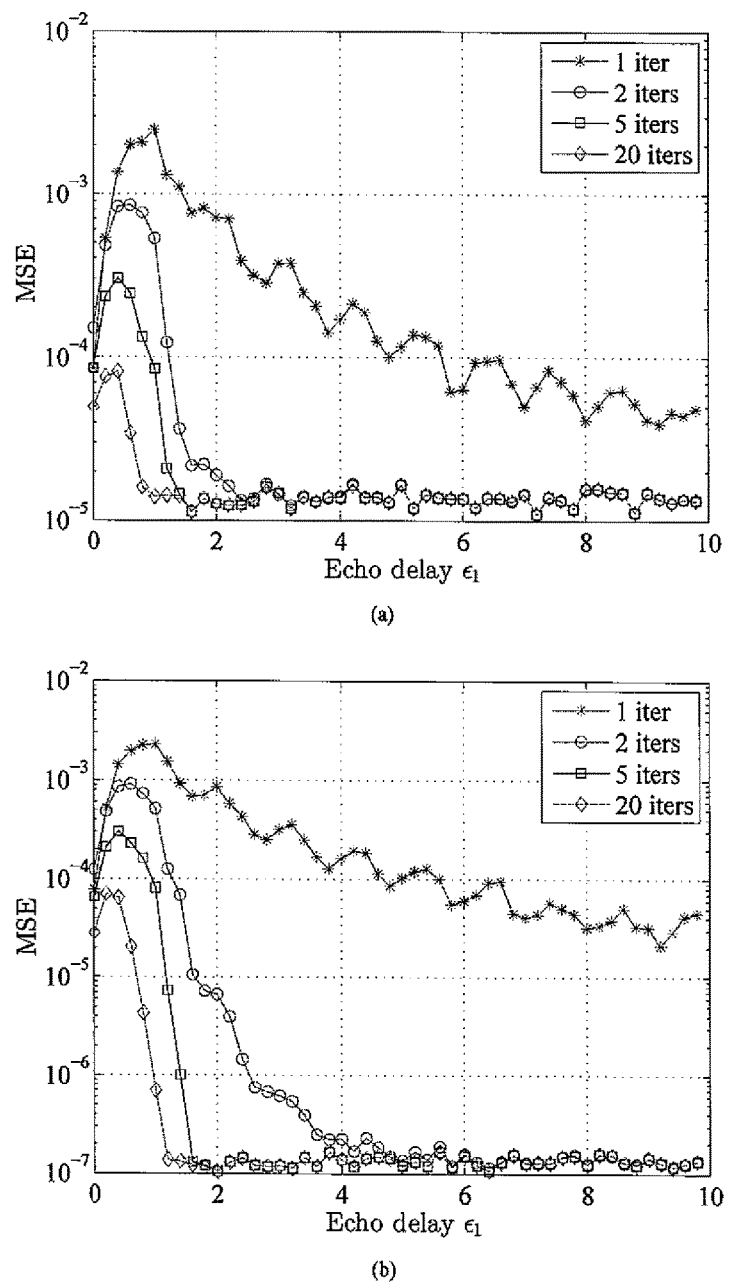
FIG. 8 shows the mean squared error of the estimation versus echo delay for 2 cases: a) SNR=20 dB and b) SNR=40 dB.

FIG. 8 illustrates the MSE of the ICE estimator for different echo delays where U=2 and so the SNR is 20 and 40 dB. Simulations were run $10^5$ times with different echo delays that are uniformly distributed between 0 and 10 samples. The more realistic fractional delay channel model shows that the leakage becomes significant when $\epsilon_1 \leq 1$. As can be seen from the figure, the estimation error reaches its peak when two paths are separated by about half the sample period. When only one iteration is performed, the estimation error gradually declines as the echo delay increases, as the influence of the main path on the echo and vise versa is lessened when the delay between them increases. Interestingly, when the estimator employs more than 5 iterations, the MSE quickly drops to error floors of $10^{-5}$ and $10^{-7}$ for SNR=20 and 40 dB, respectively, which indicates that the residual leakage is successfully suppressed.

It is notable that when the echo delay is less than a sample period, the estimation error is very high as compared to the error caused by larger echo delay. Specifically, when $\epsilon_1<1$, the performance of the ICE technique is limited to around $10^{-4}$ regardless of SNR level. That observation indicates that the error floor of the ICE method shown in FIG. 7 is likely caused by scenarios in which the echo delays are less than 1 sample duration. However, even in such a challenging scenario, the estimation performance is still very reasonable (MSE≤$10^{-4}$ after 20 iterations, which is 20 dB better than the LS). Note that the algorithm requires a larger number of iterations to accurately detect echoes with less than one sample delays. Therefore, the estimation process can be further simplified by adaptively performing more iterations for echoes with short delays and fewer iterations for echoes with longer delays. Simulations indicate that for any echo delay greater than 6 samples, only 2 iterations are needed to accurately detect the multipath channel's coefficients.

Figure 9:
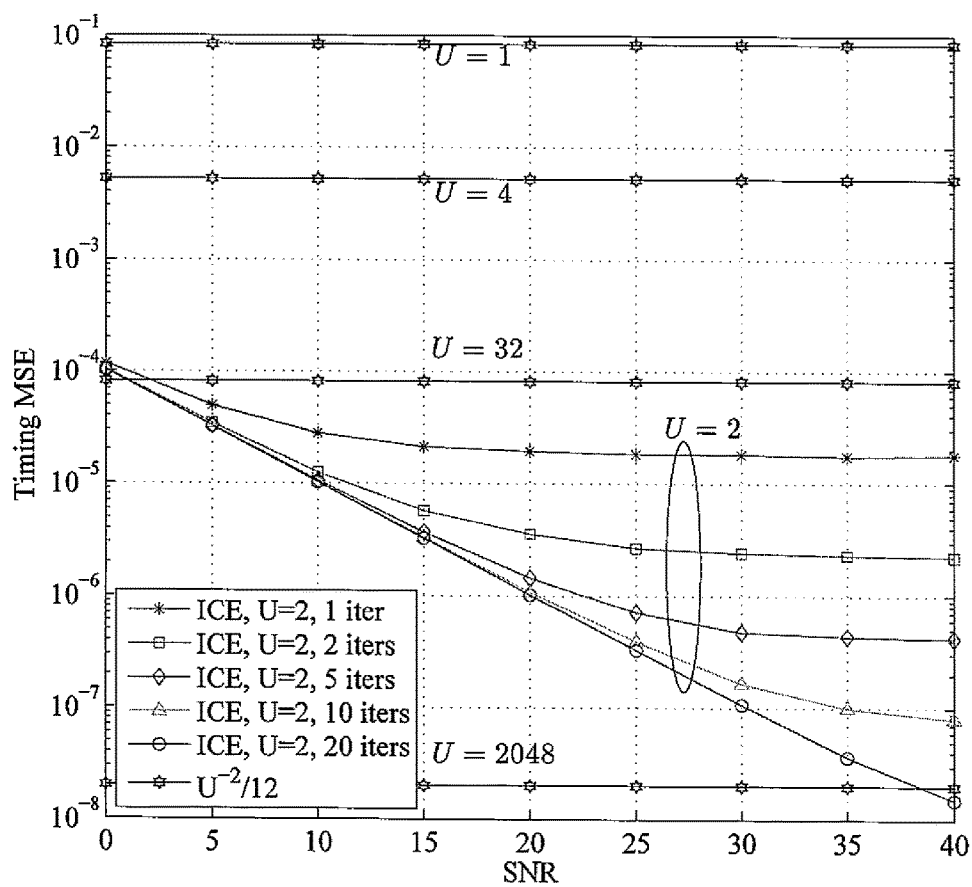
FIG. 9 illustrates the MSE of fine timing offset estimation.

Since $\tau_0$ is the delay of the main path, it is also the timing error. Therefore the proposed technique not only estimates the channel's frequency response, but also detects the timing error. FIG. 9 illustrates the variance of timing estimation error normalized to a sample period, i.e., $\mathbb{E}\{|\hat{\tau}_0-\tau_0|^2\}$, for various SNR values. The simulation parameters are the same as in FIG. 7, where the up-sampling factor U is fixed at 2 and a maximum of 20 iterations were executed for each detection. To avoid the most difficult detection scenario discussed previously, $\epsilon_1$ is constrained to be greater or equal to 1. As can be seen in FIG. 9, at 20 iterations, the timing MSE decays exponentially with SNR, indicated by the straight line in the figure.

Conventional OFDMA timing detection techniques, as set out in Document 9 above, are all timing-metric based estimation techniques, which limit detection resolution to a sample period. Therefore, timing offset variance of these conventional techniques is inherently greater than $1/12$, which is easily outperformed by the proposed algorithm. The initial ICE algorithm has a timing offset that is uniformly distributed between −0.5/U and 0.5/U. Therefore, the timing variance of the initial ICE algorithm would asymptotically approach $U^{-2}/12$, which is also plotted in FIG. 9. As such, the introduced interpolation method is very important as it provides excellent timing estimates for a small computational cost.

Figure 10:
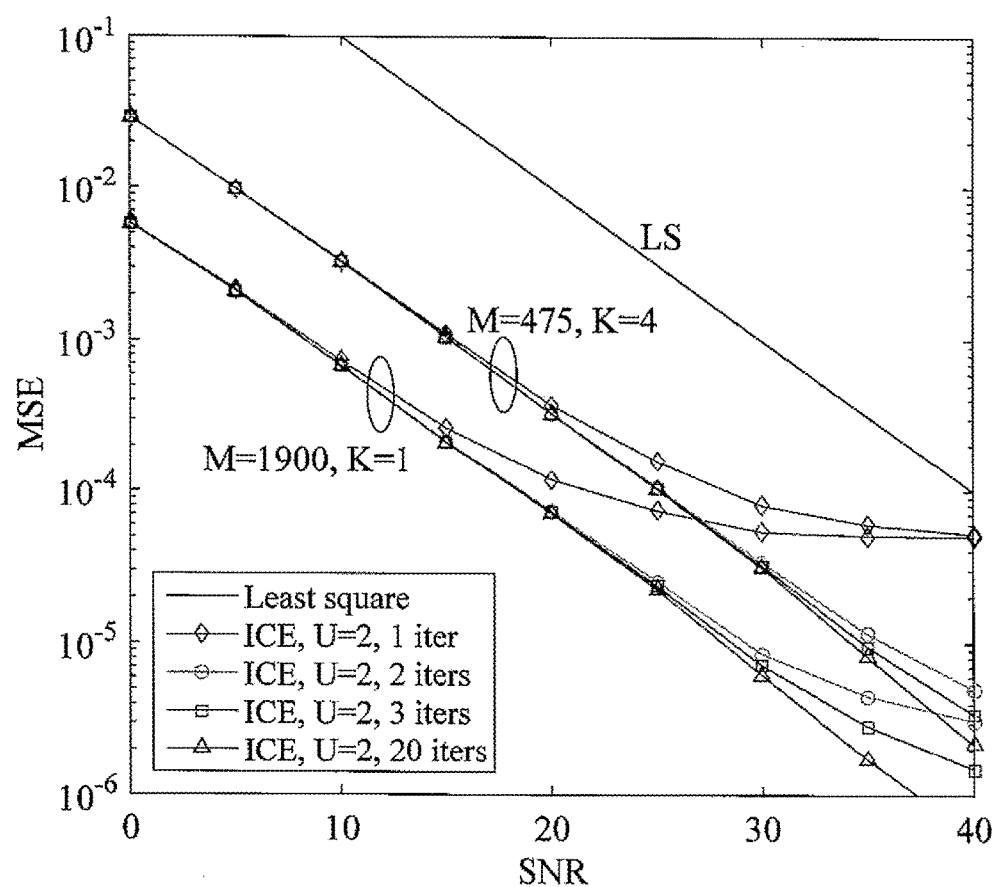
FIG. 10 shows the performance of the proposed technique for the case of 6 echoes.

FIG. 10 illustrates the performance for a 6 echo scenario (L=7), where the 6 echoes have strengths and delays as specified in Table. I. $\epsilon_1$ is constrained to be greater or equal to 1 and $\hat{L}$=L=7. The simulation was run for two different skipping factors: K=1, i.e. no sub-carrier skipping, and K=4 which limits the number of pilot sub-carriers to M=1900/4=475. The simulation used U=2 and 20 iterations for each detection. As predicted, when $\epsilon_1>1$, performance of the ICE algorithm shows no apparent error floor. Furthermore, significant improvements are seen after the first few iterations, which is consistent with observations made from FIG. 8 and FIG. 7.

As shown FIG. 10, the performance for K=4 is about 6 dB worse than for K=1. This makes sense since the noise power $$\sigma_p^2 = \frac{\sigma_w^2}{M}$$

is inversely roportional to M, so it increases by 6 dB when the number of pilot sub-carriers is reduced from 1900 to 475. Therefore, experimental evidence suggests that the performance of the ICE technique scales well with the number of pilot sub-carriers.

Figure 11:
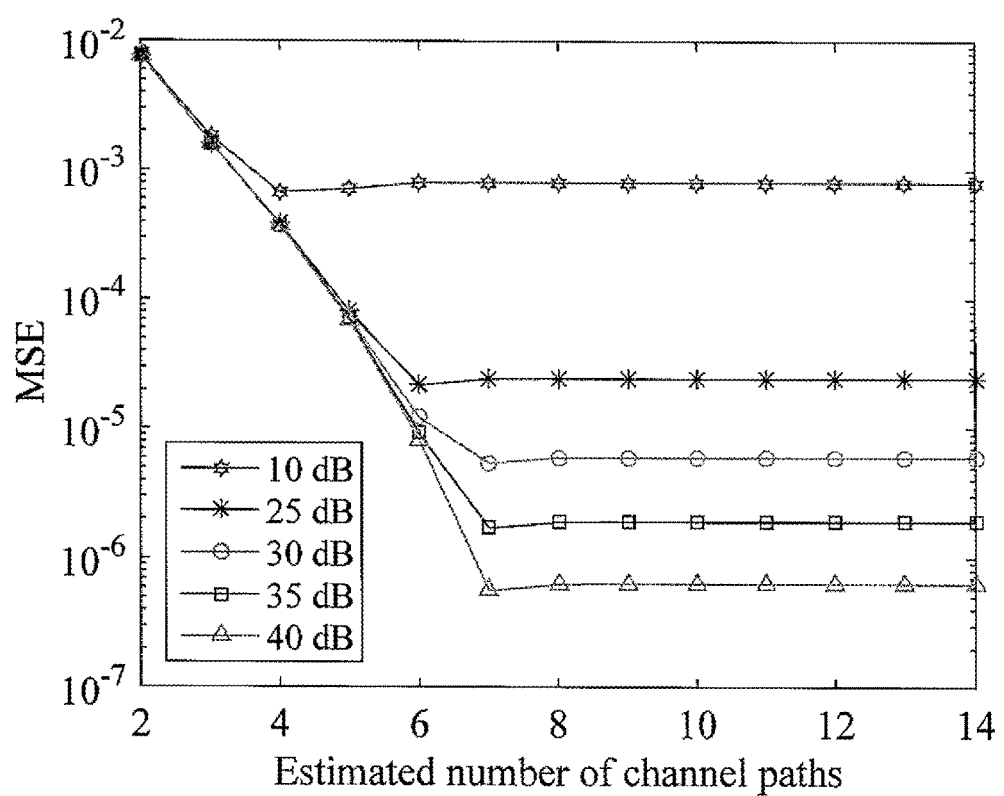
FIG. 11 shows the MSE performance versus the estimated number of channel paths.

Finally, FIG. 11 shows the MSE performance when the estimated number of channel paths, $\hat{L}$, differs from the true number of paths, L. The simulation parameters are the same as in FIG. 10 for the 7 paths channel described in Table I. The skipping factor is K=1 and the SNR is varied from 10 to 40 dB. When SNR=10 dB, the best performance is achieved when $\hat{L}$=4. This is because the power of the $4^{th}$, $5^{th}$ and $6^{th}$ echoes are close to or less than the noise power, $\sigma_p^2$, and thus can not be detected properly. A similar trend is observed when the SNR increases to 25 dB, in which case $\hat{L}$=6 gives the best performance since only the last channel tap can not be detected due to noise.

The detection performance behaves differently in the high SNR region, i.e. when SNR≥30 dB. In particular, the best performance is observed when $\hat{L}$ is given the exact number of channel paths, e.g. when $\hat{L}$=7. As expected, when $\hat{L}$<7, under-detection significantly reduces channel estimation performance. However, only negligible performance degradations so are observed with over-detection, e.g. when $\hat{L}$>7, due to the threshold that mitigates the possibility of mis-identifying noise samples as channel paths.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A method of estimating a multipath channel's frequency response in a digital communication system;
said digital communication system comprising:
    a transmitter, a receiver, and a transmission channel, which could be wired or wireless and may distort a transmitted signal;
    the transmitted signal having the following characteristics:
        a bandwidth and spectral shape known to both the transmitter and the receiver;
        a test sequence embedded within the transmitted signal;
        a content of the test sequence being known in advance by both the transmitter and the receiver;
        a location of the test sequence both in time and frequency being known by both the transmitter and the receiver;
    wherein a transmission channel is a multipath channel, comprising a plurality of channel paths, including a dominant channel path; and wherein the method comprises
at the receiver:
downconverting the transmitted signal at the receiver to baseband;
locating and extracting a received version of the test sequence from the transmitted signal;
executing a signal processing algorithm upon the received version of the test sequence in order to estimate the multipath channel's frequency response; the signal processing algorithm comprising the steps of:
    modeling the multipath channel as a series of L multipath components, each having an associated delay and gain factor which are to be estimated;
    calculating an initial rough approximation of the multipath channel's impulse response using the received version of the test sequence;
    iteratively estimating the associated delay and gain factor of each multipath component by:

a) performing peak detection on absolute values of the approximation of the multipath channel's impulse response to estimate a gain factor and delay of the dominant channel path;

b) modulating the gain factor and delay of the dominant channel path with a modeling function to obtain an estimate of the effect of the dominant channel path upon the approximation of the multipath channel's impulse response, where the modeling function is determined based upon the bandwidth and spectral shape of the transmitted signal;

c) subtracting the estimate of the effect of the dominant channel path from the approximation of the multipath channel's impulse response, such that the next largest channel path in terms of gain factor's magnitude becomes the dominant channel path in the remaining approximation of the multipath channel's impulse response;

d) repeating L−1 times, said delay and gain factor estimation steps a) to c) to obtain associated delays and gain factors of the plurality of channel paths;

e) iteratively performing steps a) to d) one or more times in order to further refine the estimate of the associated delay and gain factor of each multipath component until a desired level of accuracy is reached; and f) using the associated delay and gain factors of each multipath component obtained at the last iteration to obtain the frequency response of the multipath channel by applying a discrete Fourier transformation.

2. The method of claim 1, wherein the initial rough approximation of the multipath channel's impulse response is upsampled to provide better resolution.

3. The method of claim 1, wherein the peak detection is enhanced by performing log-domain interpolation.

4. The method of claim 2, wherein the peak detection is enhanced by performing log-domain interpolation.

5. The method of claim 1 further comprising:

the transmitted signal is an OFDM/OFDMA signal having the characteristics that the test sequence consists of a set of pilot subcarriers which are inserted into a single OFDM/OFDMA symbol;

the pilot subcarriers are equally spaced with a constant subcarrier skipping factor of K;

the pilot subcarriers can have guard-band at both sides of the spectrum;

the signal processing algorithm has the following characteristics:

the rough initial estimation of the multipath channel impulse response is generated by performing an inverse discrete Fourier Transform upon the received version of the pilot subscribers; and the modeling function used to obtain an estimate of the effect of the dominant channel path upon the multipath channel impulse response is a periodic sine function the periodic the periodic since function sine function being:

$$psinc(x, M) = \begin{cases} \frac{\sin(\pi M x)}{M \sin(\pi x)}, & x \notin \mathbb{Z} \\ (-1)^{x(M-1)}, & x \in \mathbb{Z} \end{cases}.$$

6. The method of claim 5, wherein the initial rough approximation of the channel's impulse response is calculated by using a (NU/K)-point discrete Fourier Transform, where U is suitably chosen upsampling factor, the (NU/K)-point discrete Fourier Transform being:

$$q[u] = \frac{1}{M} \sum_{m=0}^{M-1} \frac{Y[m]}{X[m]} \exp\left(\frac{j2\pi(m + (S(0) - N/2)/K)u}{NU/K}\right).$$

7. The method of claim 5, wherein the peak detection is enhanced by performing log-domain interpolation according to:

$$\theta_r \approx \beta \ln(\kappa) + 0.5 = \beta(\ln(|q_i^{[v]}[\hat{u}_i]|) - \ln(|(q_i^{[v]}[\hat{u}_i+1]|)) + 0.5.$$

8. The method of claim 6, wherein the peak detection is enhanced by performing log-domain interpolation according to:

$$\theta_r \approx \beta \ln(\kappa) + 0.5 = \beta(\ln(|q_i^{[v]}[\hat{u}_i]|) - \ln(|(q_i^{[v]}[\hat{u}_i+1]|)) + 0.5.$$

* * * * *